(12) United States Patent
Spiekermann

(10) Patent No.: US 8,848,751 B2
(45) Date of Patent: Sep. 30, 2014

(54) SHORT-PULSED COMPACT MOPA

(71) Applicant: Coherent GmbH, Göttingen (DE)

(72) Inventor: Stefan Spiekermann, Hannover (DE)

(73) Assignee: Coherent GmbH, Göttingen (DE)

( * ) Notice: Subject to any disclaimer, the term of this patent is extended or adjusted under 35 U.S.C. 154(b) by 0 days.

(21) Appl. No.: 13/778,431

(22) Filed: Feb. 27, 2013

(65) Prior Publication Data

US 2014/0241386 A1    Aug. 28, 2014

(51) Int. Cl.
*H01S 3/10* (2006.01)
*H01S 3/067* (2006.01)
*H01S 3/00* (2006.01)
*H01S 3/094* (2006.01)
*H01S 3/13* (2006.01)
*H01S 3/14* (2006.01)
*H01S 3/16* (2006.01)
*H01S 3/11* (2006.01)

(52) U.S. Cl.
CPC ............ *H01S 3/06754* (2013.01); *H01S 3/00* (2013.01); *H01S 3/094053* (2013.01); *H01S 3/1301* (2013.01); *H01S 3/14* (2013.01); *H01S 3/16* (2013.01); *H01S 3/1611* (2013.01); *H01S 3/1671* (2013.01); *H01S 3/1673* (2013.01); *H01S 3/11* (2013.01); *H01S 3/1112* (2013.01)
USPC ............... 372/25; 372/30; 372/22; 372/39; 372/70

(58) Field of Classification Search
CPC . H01S 3/00; H01S 3/06754; H01S 3/094053; H01S 3/1301; H01S 3/14; H01S 3/16; H01S 3/1611; H01S 3/1671; H01S 3/1673; H01S 3/11
USPC .......................................... 372/25, 30, 32, 39
See application file for complete search history.

(56) References Cited

U.S. PATENT DOCUMENTS

| | | | |
|---|---|---|---|
| 7,256,931 | B2 | 8/2007 | Damzen |
| 8,248,688 | B2* | 8/2012 | Baird et al. ............ 359/333 |
| 2011/0103413 | A1* | 5/2011 | Kafka et al. ............ 372/22 |
| 2011/0243158 | A1 | 10/2011 | Spiekermann et al. |
| 2012/0008649 | A1 | 1/2012 | Gu et al. |
| 2013/0293941 | A1* | 11/2013 | Harter et al. ............ 359/238 |

FOREIGN PATENT DOCUMENTS

DE    102010023756 A1    12/2011
WO    2011/157386 A1    12/2011

OTHER PUBLICATIONS

Lehneis et al., "Dispersion-Free Pulse Duration Reduction of Passively Q-switched Microchip Lasers", Optics Letters, vol. 37, No. 21, Nov. 1, 2012, pp. 4401-4403.
Nodop et al., "105 kHz, 85 ps, 3 MW Microchip Laser Fiber Amplifier System for Micro-Machining Applications", Optical Society of America, 2008, 2 pages.

(Continued)

*Primary Examiner* — Dung Nguyen
(74) *Attorney, Agent, or Firm* — Morrison & Foerster LLP

(57) ABSTRACT

A master oscillator power amplifier (MOPA) system includes an oscillator having a neodymium-doped gadolinium vanadate gain-medium and delivering seed-pulses. A length of single mode fiber is used to broaden the spectrum of the seed pulse. An amplifier having a neodymium-doped yttrium vanadate gain-medium amplifies the spectrally broadened seed-pulses. The gain-spectrum of the amplifier partially overlaps the broadened pulse-spectrum, providing spectral selection of the seed-pulses in addition to amplification. This provides amplified output-pulses having a duration about one-third that of the corresponding seed-pulses.

15 Claims, 1 Drawing Sheet

(56) References Cited

OTHER PUBLICATIONS

Nodop et al., "High-Pulse-Energy Passively Q-Switched Quasi-Monolithic Microchip Lasers Operating in the Sub-100-ps Pulse Regime", Optics Letters, vol. 32, No. 15, Aug. 1, 2007, pp. 2115-2117.

Steinmetz et al., "Nonlinear Compression of Q-Switched Laser Pulses to the Realm of Ultrashort Durations", Optics Express, vol. 19, No. 4, Feb. 14, 2011, pp. 3758-3764.

Steinmetz et al., "Reduction of Timing Jitter in Passively Q-Switched Microchip Lasers using Self-Injection Seeding", Optics Letters, vol. 35, No. 17, Sep. 1, 2010, pp. 2885-2887.

Steinmetz et al., "Sub-5-ps, Multimegawatt Peak-Power Pulses from a Fiber-Amplified and Optically Compressed Passively Q-Switched Microchip Laser", Optics Letters, vol. 37, No. 13, Jul. 1, 2012, pp. 2550-2552.

International Search Report and Written Opinion received for PCT Patent Application No. PCT/EP2014/053748, mailed on May 8, 2014, 12 pages.

Millar et al., "Power Scaling of Nd:YVO4 and Nd:GdVO4 Disk Lasers Using Synthetic Diamond as a Heat Spreader", Optics Letters, vol. 34, No. 6, Mar. 15, 2009, pp. 782-784.

Voss et al., "Simultaneous Amplification and Compression of Continous-Wave Mode-Locked Nd:YAG Laser Pulses", Optics Letters, vol. 11, No. 4, Apr. 1986, pp. 210-212.

* cited by examiner

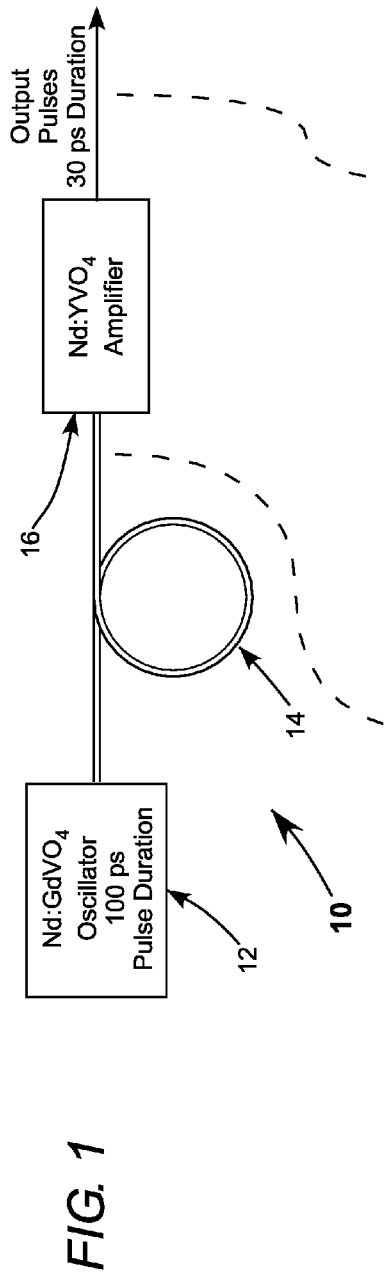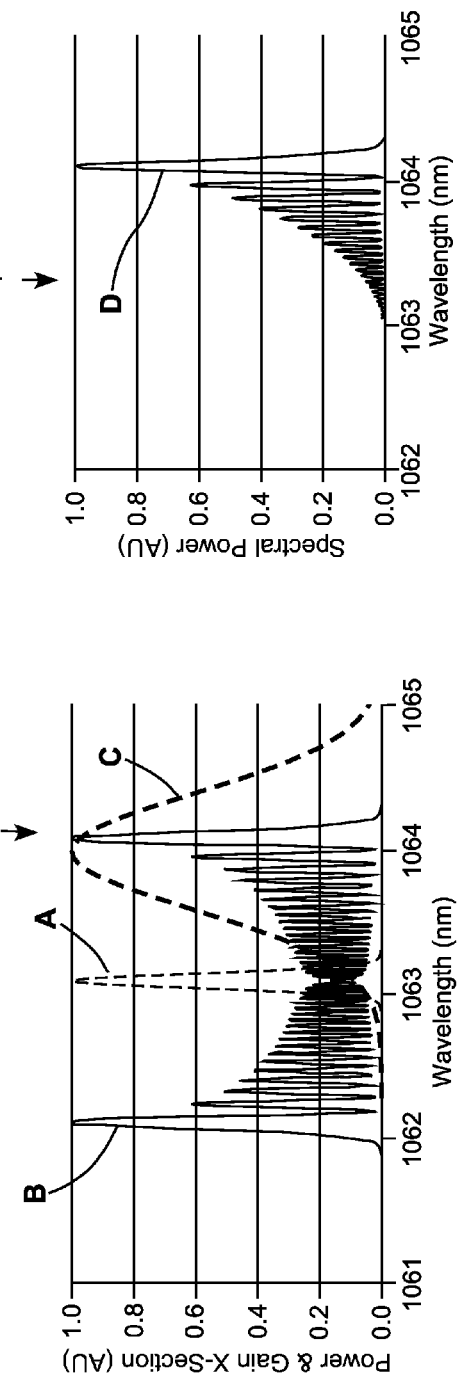
FIG. 1
FIG. 1A
FIG. 1B

US 8,848,751 B2

SHORT-PULSED COMPACT MOPA

TECHNICAL FIELD OF THE INVENTION

The present invention relates in general to pulsed master-oscillator power-amplifier (MOPA) systems. The invention relates in particular to methods of pulse-shortening in such systems.

DISCUSSION OF BACKGROUND ART

Passively Q-switched microchip lasers (MCLs) have been demonstrated as a promising concept for realizing compact laser-sources for various applications. MCLs employing neodymium doped yttrium vanadate (Nd:YVO$_4$) as a solid-state gain medium and passively Q switched by a semiconductor saturable absorber mirror (SESAM) can generate pulses with durations in the 100 picosecond (ps) range with energies of several 100 nanojoules (nJ). One microchip laser suitable for use with this gain medium is described in detail in U.S. Pre-grant Publication No. 20110243158, the complete disclosure of which is hereby incorporated herein by reference.

Such MCLs have inherently single longitudinal mode operation, and exhibit nearly diffraction-limited beam quality. This makes these MCLs potentially suitable for applications including spectroscopy, frequency conversion, micromachining, light detection and ranging (LIDAR), and precision medical and dental operations. Where additional power is required, the output of an MCL can be optically amplified creating a MOPA system with MCL as master oscillator. One optical amplifier suitable for this purpose is described in U.S. Pat. No. 7,256,931. This amplifier is a compact, multi-pass, grazing-incidence amplifier employing a thin, relatively short slab of Nd:YVO$_4$, faced-pumped by a diode-laser array (diode-laser bar). The compact nature of the amplifier, in conjunction with the compact MCL provides for a correspondingly compact MOPA system.

A further reduction of the pulse duration, for example, from the 100 picoseconds or so provided by the MCL, to 50 ps or less, would increase the number of industrial and scientific applications for such MOPA systems. A paper by R. Lehneis et al., OPTICS LETTERS Vol. 37, No 21, 4401-3, describes shortening the duration of pulses from a Nd:YVO$_4$ MCL by spectral broadening and simultaneously amplifying the pulses in a fiber pre-amplifier (without increasing the pulse-duration) then spectrally filtering the spectrally-broadened pulses to yield pulses having a duration about one-third of the duration of the pulses from the MCL. Spectral filtering was accomplished using a volume Bragg grating (VBG). It is taught that for optimal temporal quality of the shortened pulses, the spectral selection must be made from an edge of the broadened spectrum.

While the method of Lehneis et al. is elegant as an academic demonstration, it has certain shortcomings as far as realizing a commercial laser product is concerned. The requirement for a VBG would at least add significant cost to the system. This could possibly be somewhat mitigated by using a Lyot filter of comparable efficiency and sufficiently narrow bandwidth, for example, less than about 1 nanometer. However, such a filter may be subject at least to temporal drift of center wavelength of the pass-band of the filter. A drift toward the center of the broadened pulse spectrum would result in reduced temporal quality of the shortened pulses. A drift away from the center of the broadened spectrum could result in at least a significant reduction of power in the shortened pulses. There is a need for a more cost effective and reliable method of shortening pulses for a MCL.

SUMMARY OF THE INVENTION

The present invention is directed to generating relatively short-duration pulses in a compact solid-state MOPA system. In one aspect of the invention, a method of generating such an optical pulse comprises delivering an optical seed-pulse from a laser having a first neodymium-doped vanadate gain-medium. The optical pulse has a first pulse-duration and a spectral bandwidth around an emission wavelength characteristic of the first neodymium-doped gain-medium. The spectral bandwidth of the optical seed-pulse is then broadened. The spectral-bandwidth broadened optical seed-pulse pulse is amplified in an optical amplifier to provide the optical pulse. The optical amplifier has a second neodymium-doped vanadate gain-medium different from the first neodymium-doped vanadate gain-medium. The second neodymium-doped gain-medium has a gain-bandwidth around a peak-gain wavelength characteristic of the second neodymium-doped gain-medium and spaced apart in wavelength from the emission-wavelength of the first neodymium-doped vanadate gain-medium. The gain-bandwidth of the second neodymium-doped vanadate gain-medium partially overlaps in wavelength the broadened spectral bandwidth of the optical seed pulse. The partial overlapping is selected such that a portion of the gain-bandwidth of the second neodymium-doped vanadate gain-medium lies outside the broadened spectral bandwidth. This provides that the optical pulse has a second pulse-duration shorter than the first pulse-duration.

In a preferred embodiment of the invention, the first gain-medium is neodymium-doped gadolinium vanadate which provides seed pulse at an emission wavelength of about 1063.1 nm with 100 picoseconds duration. The seed-pulse bandwidth is broadened to about 2.1 nm symmetrically around the emission wavelength. The second (amplifier) gain-medium is neodymium-doped yttrium vanadate which has a peak gain wavelength of about 1064 nm and a gain-bandwidth of about 1 nm. The resulting amplified pulse duration is about 30 ps.

Neodymium doped vanadate gain-media are selected for both the laser and the amplifier stage because of their unmatched high emission cross-section. No other solid state laser crystal family provides a comparable high gain. This is advantageous for the laser because high gain results in high repetition rate and short pulses. It is advantageous for the amplifier stage, enabling high extraction efficiency and compact optical arrangements.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

FIG. 1 schematically illustrates a preferred embodiment of a compact MOPA in accordance with the present invention including a Nd:GdVO$_4$ passively Q-switched oscillator delivering pulses having a duration of about 100 ps, an optical fiber arranged to receive the pulses from the oscillator and spectrally broaden the pulses, and a Nd:YVO$_4$ amplifier for amplifying a portion of the spectrum of the spectrally broadened pulses to produce amplified output-pulses having a duration of about 30 ps.

FIG. 1A is graph schematically illustrating spectral power of the 100 ps-pulses from the Nd:GdVO$_4$ passively Q-switched oscillator of FIG. 1, spectral power of the broadened pulses, and the gain cross-section of the Nd:YVO$_4$ amplifier of FIG. 1, all as a function of wavelength.

FIG. 1B is a graph schematically illustrating spectral power as a function wavelength for the 30 ps-output-pulses from the Nd:YVO$_4$ amplifier of FIG. 1.

DETAILED DESCRIPTION OF THE INVENTION

Referring now to the drawings, wherein like components are designated by like reference numerals, FIG. 1 schematically illustrates a preferred embodiment 10 of a compact MOPA in accordance with the present invention. MOPA 10 including a Nd:GdVO$_4$ passively Q-switched oscillator 12 delivering seed-pulses having a duration of about 100 ps. This is preferably a micro-laser of the type referred to in the above referenced U.S. Pre-grant Publication No. 20110243, but this should not be considered as limiting the present invention. Similarly, the 100 ps pulse duration is merely exemplary and principles of the inventive MOPA are applicable with seed pulses having any duration in a range between about 50 ps and about 400 ps. In this particular example, the seed-pulses have a FWHM spectral bandwidth of about 20 picometers (pm) around a center wavelength (nominal emission-wavelength) of about 1063.1, characteristic of the Nd:GdVO$_4$ gain-medium of laser 12.

An optical fiber 14, here a passive fiber, is arranged to receive the pulses from the oscillator and spectrally broaden the pulses by self-phase modulation SPM, a nonlinear effect. A preferred fiber for this purpose is a single-mode fiber having a length of several meters. This would broaden the spectrum of the seed-pulses about symmetrically around the center wavelength of the seed-pulse spectrum without significantly increasing the duration of the seed-pulses. The broadened spectrum would have a FHWM bandwidth of about 2.1 nm. In practice, slight departures from spectral symmetry, and slight changes in pulse duration may result from other nonlinear effects, for example Raman scattering.

Spectrally broadened seed-pulses form optical fiber 14 are partially amplified by solid-state amplifier 16 having a Nd:YVO$_4$ gain-medium. This amplifier is preferably a compact, face-pumped, slab amplifier of the type described in the above-referenced U.S. Pat. No. 7,256,931 patent, but, here again, this should not be considered as limiting the present invention. Nd:YVO$_4$ may be used as a gain-medium in other forms of solid-sate amplifier without departing from the spirit and scope of the present invention. It should be noted, however, that in this example the Nd:YVO$_4$ gain-medium is not selected arbitrarily, but to specifically be cooperative with the equally specifically selected Nd:GdVO$_4$ gain-medium of seed-pulse laser 12. The form of the selected cooperation between the specific gain-media in conjunction with the spectral broadening of seed-pulses is illustrated by the graph of FIG. 1A, which represents a situation at the input of amplifier 16.

In FIG. 1A the spectrum of a seed-pulse from laser 12 is schematically depicted by fine-dashed curve A. The center (peak-power) wavelength is located at about 1063.1 nm. Fine-solid curve B is the computed spectrum of pulse A after broadening in a fiber having the exemplary parameters discussed above. The FWHM bandwidth of the broadened spectrum is about 2.1 nm. Bold-dashed B schematically depicts the gain-cross section spectrum of the Nd:YVO$_4$ gain medium of amplifier 16, which partially overlaps the broadened spectrum of the seed pulse and has a FWHM gain-bandwidth of about 1 nm about a characteristic peak-gain wavelength of about 1064 nm.

The effect of this partial overlap of the amplifier gain-spectrum with the broadened seed-pulse spectrum is to effectively spectrally filter the broadened seed-pulse spectrum while amplifying the seed pulse. It is critical that this partial overlapping of the gain bandwidth spectrum and the broadened spectrum of the seed pulse occurs such that a portion of the gain-bandwidth spectrum lies outside the broadened pulse spectrum. This makes spectral selection by the amplifier effectively much narrower than the gain-bandwidth of the amplifier gain-medium alone. Here, about one-half of the gain-spectrum (gain-bandwidth) selects less than one-half of the broadened seed-pulse spectrum while amplifying. This provides that output pulses from the amplifier are reduced in duration. In this example, the amplified pulses will have a duration of about 30 ps.

The computed spectrum of such an output pulse is depicted in FIG. 1B. This is essentially the normalized product of the Nd:YVO$_4$ gain-spectrum and curve B in FIG. 1A. Even though the spectrum is deeply modulated, the associated temporal pulse will be nearly transform limited. A phase-curve corresponding to the spectral curve B of FIG. 1A would fluctuate in the region of the center wavelength of the Nd:GdVO$_4$ seed-pulse, but would have a linear slopes (of opposite sign) on each side of that region. It is this linear slope that allows the spectral selection by the amplifier to produce the nearly transform limited, temporally shortened, output-pulse.

It should be noted here that output pulse spectrum while narrower than the broadened spectrum of the seed pulse is sufficient to allow for further reduction in the duration of the output pulses using a dispersive pulse-compressor. One suitable dispersive pulse compressor would be a diffraction-grating pulse compressor.

Were the Nd:YVO$_4$ amplifier to be replaced with a Nd:GdVO$_4$ amplifier, there would be less spectral selection than in the case of the Nd:YVO$_4$ amplifier as the entire gain-spectrum would fit within the broadened pulse-spectrum. Further, the peak gain of the amplifier would be in the region of the broadened spectrum where the phase fluctuations occur. A result of this would be that the amplifier output pulses would not be transform limited, but would exhibit pre-pulses or post pulses often referred to as "pedestals" by practitioners of the pulsed laser art. These are generally unsuitable in most applications.

The present invention is described above in a context of using two particular neodymium-doped vanadate (more precisely orthovanadate) gain-media, Nd:YVO$_4$ and Nd:GdVO$_4$ for amplifier and seed-laser respectively, there is another neodymium-doped vanadate gain-medium, neodymium-doped lutetium vanadate (Nd:LuVO$_4$), that adds flexibility to the inventive MOPA arrangement. Nd:LuVO$_4$ provides gain and emission at a wavelength around 1066 nm. Accordingly, an embodiment of the inventive MOPA can be contemplated in which the seed-laser employs a Nd:YVO$_4$ gain-medium and the amplifier employs a Nd:LuVO$_4$ gain-medium. This can provide (depending on the degree of spectral broadening of the seed-pulse), for less spectral overlap between the amplifier gain and the broadened spectrum, and accordingly more reduction in pulse-duration than is provided in the above described embodiment. It should be noted that the longer wavelength gain-medium of any two selected can be used in the seed-laser, and the other used in the amplifier.

A "mixed vanadate" such as Nd:Gd$_x$Y$_{1-x}$VO$_4$ (where 1>x>0) could be used for either the oscillator or the amplifier. However, if such a material is used for both the amplifier and oscillator, it may not be possible to achieve sufficient difference between the peak gain wavelengths of the oscillator and amplifier, by varying fraction x, to provide a desired pulse-duration reduction.

It is emphasized, here again, that in the inventive MOPA the oscillator and amplifier cannot use the same vanadate gain-medium. While using the same gain-medium would provide pulse-duration reduction due to spectral selection, the resulting reduced-duration pulse would not be even close to transform limited. The pulse would exhibit an undesirable "pedestal" or one or more pre-pulses or post pulses, as discussed above. These are conditions totally unsuited for precise laser-processing operations While the gain-media properties are fixed, characteristic properties of the media, there is flexibility, within limits, in the degree of spectral broadening. In empirical terms, if the broadening is too strong, then the region with phase-fluctuation would be amplified resulting in a non-transform limited pulse. If the broadening is too weak, then the efficiency of the amplification would be reduced. Spectral broadening can be calculated for a given fiber length and seed pulse power. Alternatively, the broadening can readily be determined experimentally using varied lengths of fiber. Experimental determination will expose any of the above discussed potential variations in symmetry of broadening due to nonlinear effects other than SPM.

It should also be noted that while fiber 14 is described above as a passive fiber, an active-fiber could be used to provide amplification in addition to spectral broadening without departing from the spirit and scope of the present invention. In order to provide significant amplification the fiber would need to be an expensive photonic crystal type fiber or a large mode area (LMA) fiber. A fiber amplifier, however, cannot take the place of the solid-state amplifier of the inventive MOPA. This is because the gain spectrum of an active (laser-ion doped) fiber is too broad (because the fiber is amorphous glass based) to provide adequate spectral selectivity of amplification.

In summary the present invention is described above with reference to a preferred and other embodiments. The invention, however, is not limited to the embodiments described and depicted. Rather the invention is limited only by the claims appended hereto.

What is claimed is:

1. Optical apparatus, comprising:
a laser having a first neodymium-doped vanadate gain-medium for delivering an optical pulse having a first pulse-duration and a first spectral bandwidth around an emission wavelength characteristic of the first neodymium-doped gain-medium;
an optical fiber arranged to receive the optical pulse and broaden the spectral bandwidth of the pulse to a second spectral bandwidth;
an optical amplifier for amplifying the bandwidth-broadened optical pulse to provide an amplified optical pulse, the optical amplifier having a second neodymium-doped vanadate gain-medium different from the first neodymium-doped vanadate gain-medium, the second neodymium-doped gain-medium having a gain-bandwidth about a peak-gain wavelength characteristic of the second neodymium-doped gain-medium and spaced apart in wavelength from the emission-wavelength of the first neodymium-doped vanadate gain-medium; and
wherein the gain-bandwidth of the second neodymium-doped vanadate gain-medium partially overlaps in wavelength the broadened spectral bandwidth of the optical pulse in a manner such that a portion of the gain-bandwidth of the second neodymium-doped vanadate gain-medium lies outside the broadened spectral bandwidth of the pulse, whereby the amplified optical pulse has a second pulse-duration shorter than the first pulse-duration.

2. The apparatus of claim 1, wherein the first and second different neodymium-doped vanadate gain-media are selected from a group of neodymium-doped vanadate gain media consisting of neodymium-doped yttrium vanadate, neodymium-doped gadolinium vanadate, neodymium-doped yttrium gadolinium vanadate, and neodymium-doped lutetium vanadate.

3. The apparatus of claim 2, wherein the first gain-medium is neodymium-doped gadolinium vanadate and the second gain-medium is neodymium-doped yttrium vanadate.

4. The apparatus of claim 3, wherein the emission wavelength of the first gain-medium is about 1063.1 nanometers and the peak-gain wavelength of the second gain-medium is about 1064 nm.

5. The apparatus of claim 4 wherein the broadened spectrum of the optical pulses has a FWHM bandwidth of about 2.1 nm and gain-bandwidth of the second gain-medium is about 1.0 nm.

6. The apparatus of claim 5, wherein the first pulse-duration is about 100 picoseconds and the second pulse-duration is about 30 picoseconds.

7. The apparatus of claim 1, wherein the optical fiber is a passive fiber.

8. The apparatus of claim 1, wherein the optical fiber is an active fiber.

9. The apparatus of claim 1, wherein the optical fiber is a single-mode fiber.

10. The apparatus of claim 1, wherein the laser is a passively Q-switched laser.

11. The apparatus of claim 1, wherein the first pulse duration is between about 50 picoseconds and about 400 picoseconds.

12. The apparatus of claim 1, wherein the broadened spectral bandwidth is distributed about symmetrically about the emission wavelength.

13. A method for generating an optical pulse, comprising:
delivering an optical seed-pulse from a laser having a first neodymium-doped vanadate gain-medium, the optical pulse having a first pulse-duration and a spectral bandwidth around an emission wavelength characteristic of the first neodymium-doped gain-medium;
broadening the spectral bandwidth of the optical pulse; and
amplifying the spectral-bandwidth broadened optical pulse in an optical amplifier to provide the optical pulse, the optical amplifier having a second neodymium-doped vanadate gain-medium different from the first neodymium-doped vanadate gain-medium, the second neodymium-doped gain-medium having a gain-bandwidth around a peak-gain wavelength characteristic of the second neodymium-doped gain-medium and spaced apart in wavelength from the emission-wavelength of the first neodymium-doped vanadate gain-medium, and the gain-bandwidth of the second neodymium-doped vanadate gain-medium partially overlapping in wavelength the broadened spectral bandwidth of the optical seed pulse in a manner such that a portion of the gain-bandwidth of the second neodymium-doped vanadate gain-medium lies outside the broadened spectral bandwidth of the seed-pulse, whereby the optical pulse has a second pulse-duration shorter than the first pulse-duration.

14. The apparatus of claim 13, wherein, the spectral bandwidth of the optical pulse is broadened by passing the optical pulse through a single-mode optical fiber.

15. The apparatus of claim 13, wherein the first and second different neodymium-doped vanadate gain-media are selected from a group of neodymium-doped vanadate gain media consisting of neodymium-doped yttrium vanadate, neodymium-doped gadolinium vanadate, neodymium-doped yttrium gadolinium vanadate, and neodymium-doped lutetium vanadate.

* * * * *